(12) United States Patent
Yim et al.

(10) Patent No.: US 9,977,156 B2
(45) Date of Patent: May 22, 2018

(54) DISPLAY DEVICE

(71) Applicant: Samsung Display Co., Ltd., Yongin, Gyeonggi-Do (KR)

(72) Inventors: Taekyung Yim, Seoul (KR); Hyun-Ho Kang, Ansan-si (KR); Hyungjune Kim, Anyang-si (KR); Osung Seo, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 293 days.

(21) Appl. No.: 14/645,263

(22) Filed: Mar. 11, 2015

(65) Prior Publication Data

US 2015/0285964 A1   Oct. 8, 2015

(30) Foreign Application Priority Data

Apr. 4, 2014  (KR) .................. 10-2014-0040701

(51) Int. Cl.
| | |
|---|---|
| *G02B 5/02* | (2006.01) |
| *G02F 1/1335* | (2006.01) |
| *G02B 5/30* | (2006.01) |
| *G02B 1/14* | (2015.01) |
| *G02F 1/1333* | (2006.01) |

(52) U.S. Cl.
CPC ........... *G02B 5/021* (2013.01); *G02B 5/0294* (2013.01); *G02F 1/133504* (2013.01); *G02F 1/133512* (2013.01); *G02F 1/133528* (2013.01); *G02B 1/14* (2015.01); *G02B 5/3033* (2013.01); *G02F 2001/133388* (2013.01)

(58) Field of Classification Search
CPC . G02B 1/10–1/18; G02B 5/02–5/0294; H04N 1/0289; H01J 11/44; G02F 1/133–1/13398
See application file for complete search history.

(56) References Cited

U.S. PATENT DOCUMENTS

| | | | |
|---|---|---|---|
| 6,505,942 B2 | 1/2003 | Ohishi et al. | |
| 8,525,958 B2* | 9/2013 | Lee ................... | G02F 1/133536 349/114 |
| 2008/0130122 A1 | 6/2008 | Egi et al. | |
| 2010/0232027 A1* | 9/2010 | Park ....................... | G02B 3/02 359/625 |
| 2010/0315570 A1* | 12/2010 | Mathew ................ | G06F 1/1637 349/58 |

(Continued)

FOREIGN PATENT DOCUMENTS

| | | |
|---|---|---|
| JP | 2002-072186 | 3/2002 |
| JP | 2012-047895 | 3/2012 |

(Continued)

*Primary Examiner* — William R Alexander
*Assistant Examiner* — Jeffrey Madonna
(74) *Attorney, Agent, or Firm* — Innovation Counsel, LLP

(57) ABSTRACT

Provided is a display device including: a display panel including a display area where an image is displayed and a non-display area surrounding the display area; and a first polarization member disposed on a front surface of the display panel and including a polarization area corresponding to the display area and a light blocking area corresponding to the non-display area, wherein the first polarization member corresponding to the light blocking area includes a plurality of scattering patterns which reduce reflectance of the non-display area.

20 Claims, 10 Drawing Sheets

(56) References Cited

U.S. PATENT DOCUMENTS

| | | | |
|---|---|---|---|
| 2012/0287645 A1* | 11/2012 | Ju | G02F 1/133512 |
| | | | 362/296.01 |
| 2013/0027629 A1 | 1/2013 | Kiyohara et al. | |
| 2013/0127742 A1 | 5/2013 | Kang | |
| 2013/0155353 A1 | 6/2013 | Ma et al. | |
| 2013/0308080 A1* | 11/2013 | Kuo | G02F 1/133512 |
| | | | 349/110 |
| 2014/0055715 A1* | 2/2014 | Lee | G02F 1/133528 |
| | | | 349/62 |
| 2014/0071550 A1* | 3/2014 | Lee | G02B 5/0825 |
| | | | 359/839 |
| 2014/0176876 A1* | 6/2014 | Shinohara | G02B 6/002 |
| | | | 349/65 |
| 2015/0219817 A1* | 8/2015 | Kim | G02B 6/004 |
| | | | 362/607 |
| 2015/0241606 A1* | 8/2015 | Kim | G02B 1/18 |
| | | | 359/513 |

FOREIGN PATENT DOCUMENTS

| | | |
|---|---|---|
| KR | 10-2008-0084352 | 9/2008 |
| KR | 10-0911825 | 8/2009 |
| KR | 10-2010-0068571 | 6/2010 |
| KR | 10-1087328 | 11/2011 |

\* cited by examiner

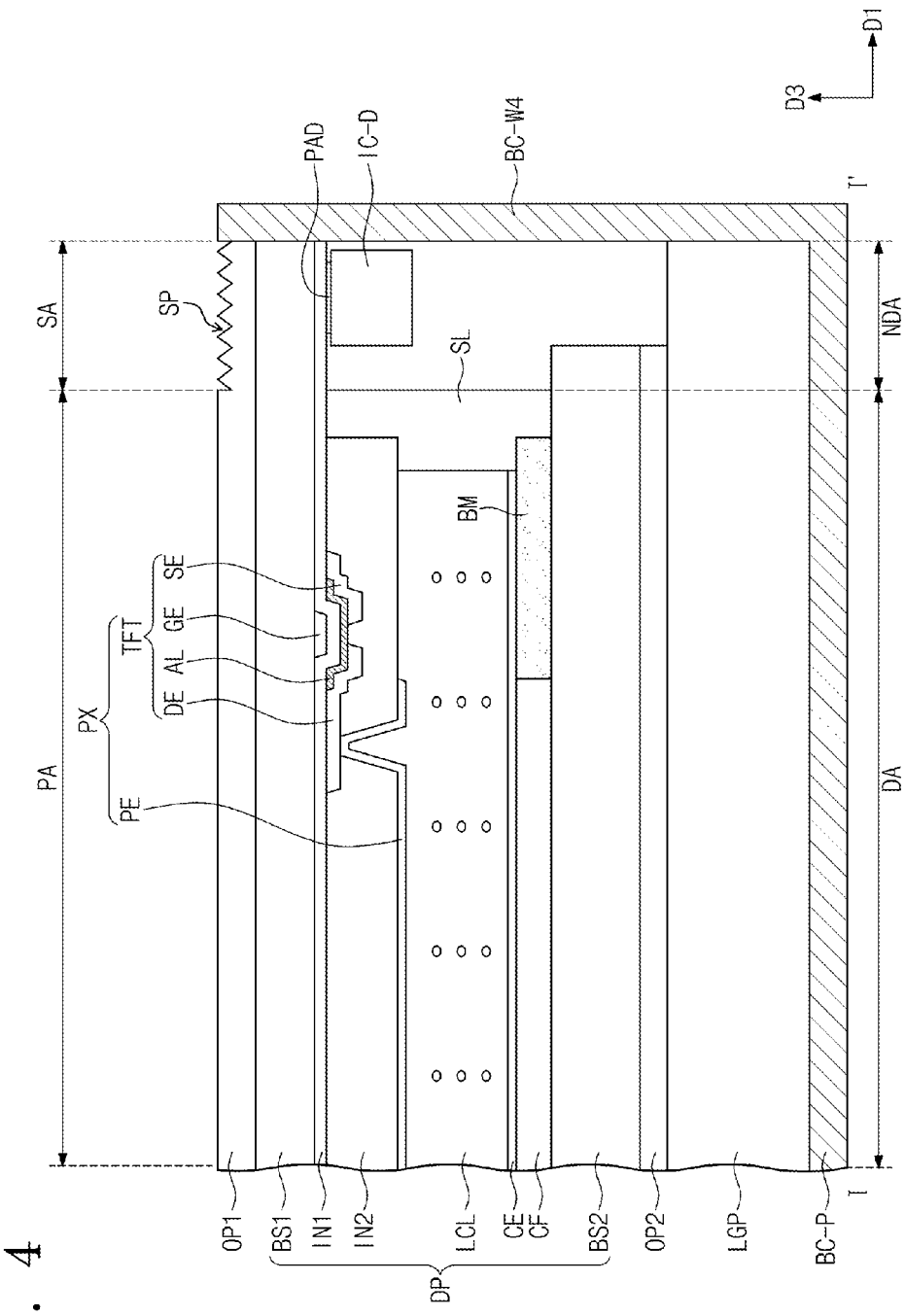

DISPLAY DEVICE

CROSS-REFERENCE TO RELATED APPLICATIONS

This U.S. non-provisional patent application claims priority under 35 U.S.C. § 119 to Korean Patent Application No. 10-2014-0040701, filed on Apr. 4, 2014, the entire contents of which are hereby incorporated by reference.

BACKGROUND

The present disclosure herein relates to a display device, and more particularly, to a low reflective display device.

Flat display devices have been developed to replace cathode ray tube display devices having a thick thickness and high power consumption. The flat display devices include organic light emitting display devices, liquid crystal display devices, and plasma display devices.

Display devices include a plurality of optical members. The optical members improve the efficiency of light generated from the inside of a display device and block the influence of external light. The display devices display an image using internal light and the influence of external light is prevented, so that visibility may be improved.

SUMMARY

The present disclosure provides a low reflective display device having a reduced external light reflectance in a non-display area.

Embodiments of the inventive concept provide display devices including: a display panel including a display area where an image is displayed and a non-display area surrounding the display area; and a first polarization member disposed on a front surface of the display panel and including a polarization area corresponding to the display area and a light blocking area corresponding to the non-display area, wherein the first polarization member corresponding to the light blocking area includes a plurality of scattering patterns which reduce reflectance of the non-display area.

In some embodiments, the external light reflectance of the light blocking area may be less than about 4%.

In other embodiments, a height of each of the plurality of scattering patterns may be more than about 0.1 μm and less than about 100 μm.

In still other embodiments, a distance between centers of adjacent scattering patterns may be more than about 100 nm and less than about 600 nm.

In even other embodiments, an average thickness of the polarization area of the first polarization member may be greater than an average thickness of the light blocking area.

In even other embodiments, the display device may further include a plurality of auxiliary scattering patterns formed between the plurality of scattering patterns In yet other embodiments, the first polarization member may include: a first base part overlapping the polarization area; and a second base part overlapping the light blocking area and having a smaller average thickness than the first base part, wherein the plurality of scattering patterns may be disposed on a front surface of the second base part.

In further embodiments, the plurality of scattering patterns may have an integrally formed with the second base part.

In still further embodiments, the plurality of scattering patterns may not be protruding from a front surface of the first base part.

In even further embodiments, each of the plurality of scattering patterns may have a conical form.

In yet further embodiments, the first polarization member may include: a first layer having a front surface that defines a front surface of the first polarization member and overlapping the polarization area; and a second layer overlapping the polarization area and the light blocking area and disposed at a bottom surface of the first layer, wherein a height of each of the plurality of scattering patterns may be equal or less than a thickness of the first layer.

In yet further embodiments, the plurality of scattering patterns may include the same material as the first layer.

In yet further embodiments, the display panel may include: a first base substrate; a plurality of pixels disposed on the first base substrate to correspond to the display area; a plurality of signal lines, each connected to a corresponding pixel among the plurality of pixels; and a driving circuit providing a driving signal to the signal lines, wherein each of the plurality of signal lines may include: a first wiring part overlapping the display area and connected to each of the pixels; and a second wiring part overlapping the non-display area and connected to the driving circuit.

In yet further embodiments, a width of the light blocking area may be less than about 1.99 mm.

In yet further embodiments, the first polarization member may be disposed on one side of the first base part defining the front surface of the display panel.

In other embodiments of the inventive concept, display devices include: a display panel including a display area where an image is displayed and a non-display area surrounding the display area; and a first polarization member disposed on a front surface of the display panel and including a polarization area corresponding to the display area and a light blocking area corresponding to the non-display area, wherein the first polarization member corresponding to the light blocking area includes a plurality of engraved patterns which reduce reflectance of the non-display area.

In some embodiments, an external light reflectance of the light blocking area may be less than about 4%.

In other embodiments, wherein the light blocking area has a width less than about 1.99 mm.

In still other embodiments, a depth of each of the plurality of engraved patterns may be more than about 0.1 μm and less than about 100 μm.

In even other embodiments, the display device may further include a plurality of auxiliary engrave patterns formed between the plurality of engraved patterns. The first polarization member may include: a polarization layer where at least one polarization axis is defined; a first protective layer disposed on a font surface of the polarization layer; and a second protective layer facing the first protective layer with the polarization layer therebetween, wherein the plurality of engraved patterns may be defined in an area overlapping the light blocking area of the first protective layer.

BRIEF DESCRIPTION OF THE DRAWINGS

The accompanying drawings are included to provide a further understanding of the inventive concept and constitute a part of this specification. The drawings illustrate exemplary embodiments of the inventive concept and, together with the description, serve to explain principles of the inventive concept. In the drawings:

FIG. 4 is a sectional view taken along a line I-I' of FIG. 3;

DETAILED DESCRIPTION OF THE EMBODIMENTS

Figure 1:
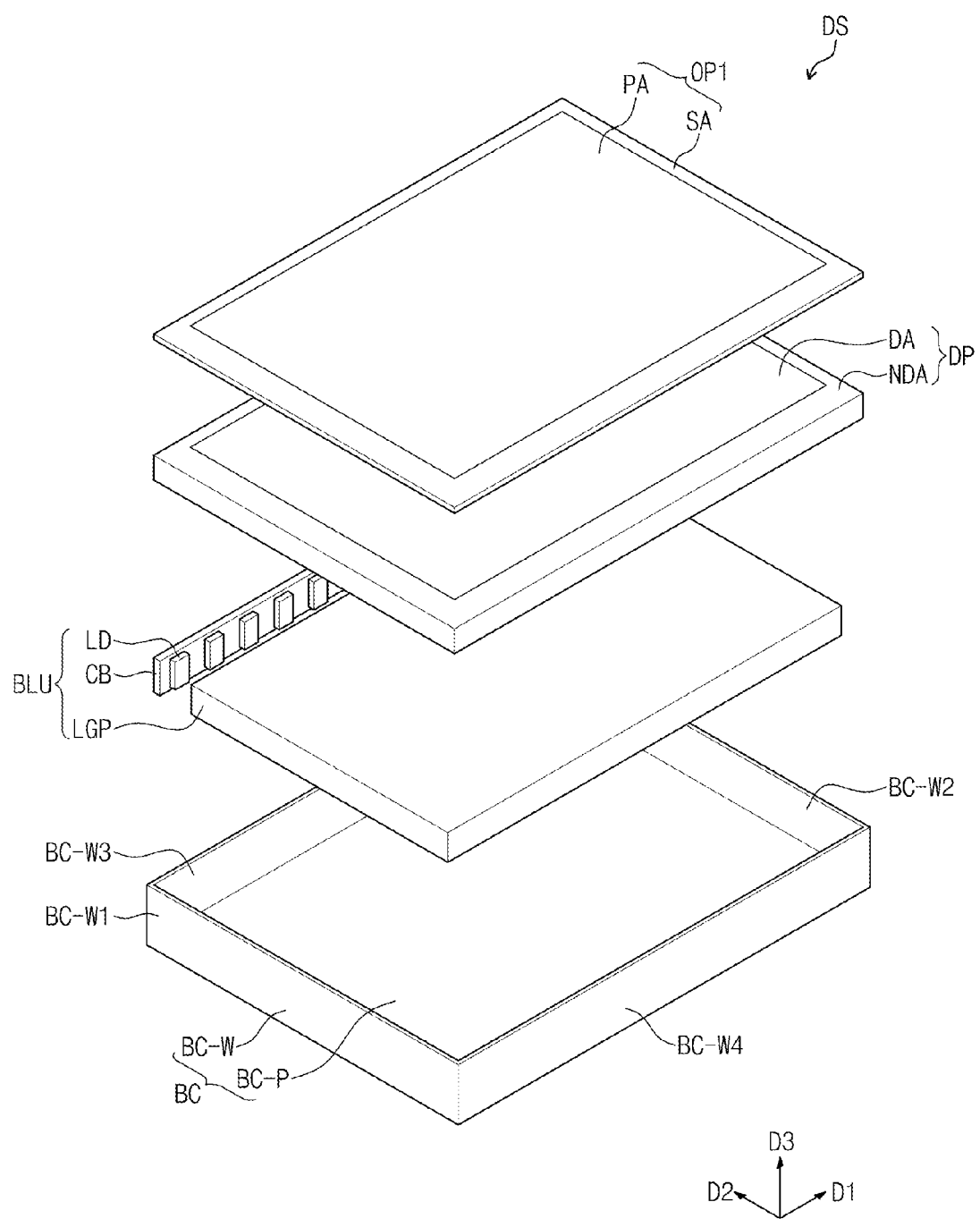
FIG. 1 is an exploded perspective view of a display device according to an embodiment of the inventive concept.

Exemplary embodiments of the inventive concept will be described below in more detail with reference to the accompanying drawings.

Advantages and features of the inventive concept, and implementation methods thereof will be clarified through following embodiments described with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is only defined by scopes of claims. Additionally, like reference numerals refer to like elements throughout the specification.

Moreover, it should be noted that elements shown in the accompanying drawings may be scaled up or down for convenience in description.

Figure 2:
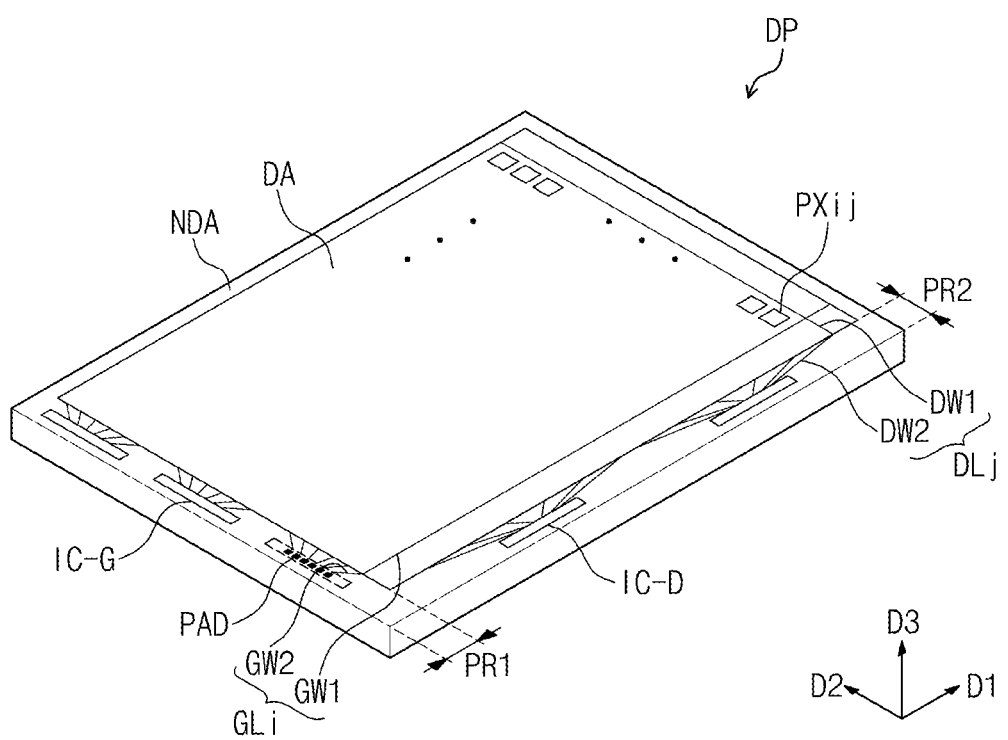
FIG. 2 is a partial perspective view of a display device according to an embodiment of the inventive concept.

FIG. 1 is an exploded perspective view of a display device according to an embodiment of the inventive concept. FIG. 2 is a partial perspective view of a display device according to an embodiment of the inventive concept. FIG. 2 illustrates a display panel DP among components shown in FIG. 1. Hereinafter, components of the display device DS will be described with reference to FIGS. 1 and 2.

The display device DS includes the display panel DP, a first polarization member OP1, a backlight unit BLU, and a cover member BC. The display panel DP includes a plurality of pixels PX, a plurality of signal lines GLi and DLj, and driving circuits G-IC and D-IC.

Various kinds of display panels may be applied to the display panel DP. For example, the display panel DP may be an Organic Light Emitting Display panel, a Liquid Crystal Display Panel, an Electrophoretic Display Panel, or an Electrowetting Display Panel.

The display panel DP includes a display area DA and a non-display area NDA. The display area DA is an area where an image is displayed. The non-display area NDA is an area where no image is displayed. For example, the non-display area NDA may surround the display area DA in a plan view.

Referring to FIG. 2, the display area DA and the non-display area NDA are described in more detail. The display area DA is an area where an electrical signal is applied from the outside so that an image is displayed. The plurality of pixels PX and the plurality of signal lines GLi and DLj are disposed in the display area DA. Driving circuits G-IC and D-IC may be disposed in the non-display area NDA. Additionally, part of the plurality of signal lines GLi and DLj connected to the driving circuits G-IC and D-IC may be disposed in the non-display area NDA.

The plurality of pixels PX are spaced apart from each other. The plurality of pixels PX may be arranged in a matrix. Each of the plurality of pixels PX is connected to a corresponding signal line among the plurality of signal lines. The plurality of pixels PX receive electrical signals from the connected signal lines and display an image.

The plurality of signal lines GLi and DLj include gate lines extending in a first direction D1 and data lines extending in a second direction intersecting the first direction D1. One gate line GLi among the gate lines and one data line DLj among the data lines are shown in FIG. 2.

The gate line GLi includes a first wiring part GW1 and a second wiring part GW2. The first wiring part GW1 overlaps the display area DA. One end of the first wiring part GW1 is connected to the pixel PXij.

The second wiring part GW2 overlaps the non-display area NDA. The second wiring part GW2 is connected to the other end of the first wiring part GW1. The second wiring part GW2 connects the driving circuit G-IC and the first wiring part GW1. The second wiring part GW2 transfers an applied electrical signal from the driving circuit G-IC to the display area DA.

The data line DLj includes a first wiring part DW1 and a second wiring part DW2. The first wiring part DW1 overlaps the display area DA. The first wiring part DW1 of the data line DLj intersects the first wiring part GW1 of the gate line GLi. One end of the first wiring part DW1 is connected to the pixel PXij.

The second wiring part DW2 overlaps the non-display area NDA. The second wiring part DW2 connects the driving circuit D-IC and the first wiring part DW1. The second wiring part GW2 transfers an applied electrical signal from the driving circuit D-IC to the display area DA.

The non-display panel NDA includes a first pad area PR1 and a second pad area PR2. The first pad area PR1 is adjacent to the display area DA in the first direction D1. A gate driving circuit G-IC, i.e., a driving circuit of the gate line GLi, may be disposed in the first pad area PR1.

The gate driving circuit G-IC provides a gate signal to the gate line GLi. The gate driving circuit G-IC is connected to a pad part PAD of the gate line GLi. The pad part PAD is defined at the end of the gate line GLi.

The second pad area PR2 is adjacent to the display area DA in the second direction D2. A data driving circuit D-IC, i.e., a driving circuit of the data line DLi, may be disposed in the second pad area PR2.

The data driving circuit D-IC provides a data signal to the data line DLi. The data driving circuit D-IC is connected to a pad part (not shown) of the data line DLi Moreover, according to another embodiment of the inventive concept, one of the first pad area PR1 and the second pad area PR2 may be omitted.

Although not shown in the drawing, the display panel DP may further include a printed circuit board disposed adjacent to at least one of the pad areas PR1 and PR2. Various devices may be mounted on the printed circuit boards and the printed circuit boards may be connected to a pad part of the gate line or a pad part of the data line. Moreover, according to another embodiment of the inventive concept, the driving circuits G-IC and D-IC are mounted on a flexible film, so that they may be connected to a pad part of the gate line or a pad part of the data line.

Referring to FIG. 1 again, the first polarization member OP1 is disposed on the front of the display panel DP. The first polarization member OP1 covers the display panel DP. The first polarization member OP1 includes a polarization area PA and a light blocking area SA.

The polarization area PA corresponds to the display area DA. The polarization area PA overlaps the display area DA. The polarization area PA transmits light vibrating in a direction parallel to a polarization axis (not shown) of the first polarization member OP1 among light incident on the first polarization member OP1.

The polarization area PA corresponds to the display area DA. For example, the light blocking area SA may surround the edges of the polarization area PA. Moreover, although not shown in the drawing, according to another embodiment of the inventive concept, the light blocking area SA may be disposed at one side of the polarization area PA. The light blocking area SA may cover the first pad area PR1 and the second pad area PR2.

The backlight unit BLU is disposed at a lower side of the display panel DP. The backlight unit BLU provides light to the display panel DP. The backlight unit BLU includes a circuit substrate CB, at least one light emitting device LD, and a light guide plate LGP.

The circuit substrate CB and the light emitting device LD are disposed on at least one side of the light guide plate LGP. The light emitting device LD generates light. The circuit substrate CB mounts the light emitting device LD on one side.

The light emitting device LD is electrically connected to the circuit substrate CB. The circuit substrate CB applies driving voltage to the light emitting device LD. Furthermore, according to another embodiment of the inventive concept, the light emitting device LD may be disposed on at least one corner of the light guide plate LGP or may be disposed on a lower side of the light guide plate LGP. The inventive concept is not limited thereto.

The light guide plate LGP is disposed at a lower side of the display panel DP. The light guide plate LGP guides a light received from the light emitting device LD toward a bottom surface of the display panel DP. The light guide plate LGP includes a bottom surface facing the cover member BC, a top surface facing the display panel DP, and a plurality of connection surfaces connecting the top surface and the bottom surface.

The top surface, the bottom surface, and at least one of the plurality of connection surfaces define a light incidence surface. The light incidence surface faces the light emitting device LD. The light incidence surface receives light from the light emitting device LD. Moreover, according to another embodiment of the inventive concept, the backlight unit BLU may be omitted.

The cover member BC accommodates the backlight unit BLU, the display panel DP, and the first polarization member OP1. The cover member BC includes a bottom part BC-P and a sidewall part BC-W bent in a third direction D3 from the bottom part BC-P.

The bottom part BC-P may be a rectangle shape in a plan view. The sidewall part BC-W is bent toward the third direction D3 from each of the four sides of the bottom part BC-P. The sidewall part BC-W may be divided into four parts BC-W1 to BC-W4 to correspond to the four sides of the bottom part BC-P.

The four parts BC-W1 to BC-W4 include first sidewalls BC-W1 and BC-W2 disposed to face each other in the first direction D1 and second sidewalls BC-W3 and BC-W4 disposed to face each other in the second direction D2. The four parts BC-W1 to BC-W4 surround the bottom part BD-P.

Figure 3:
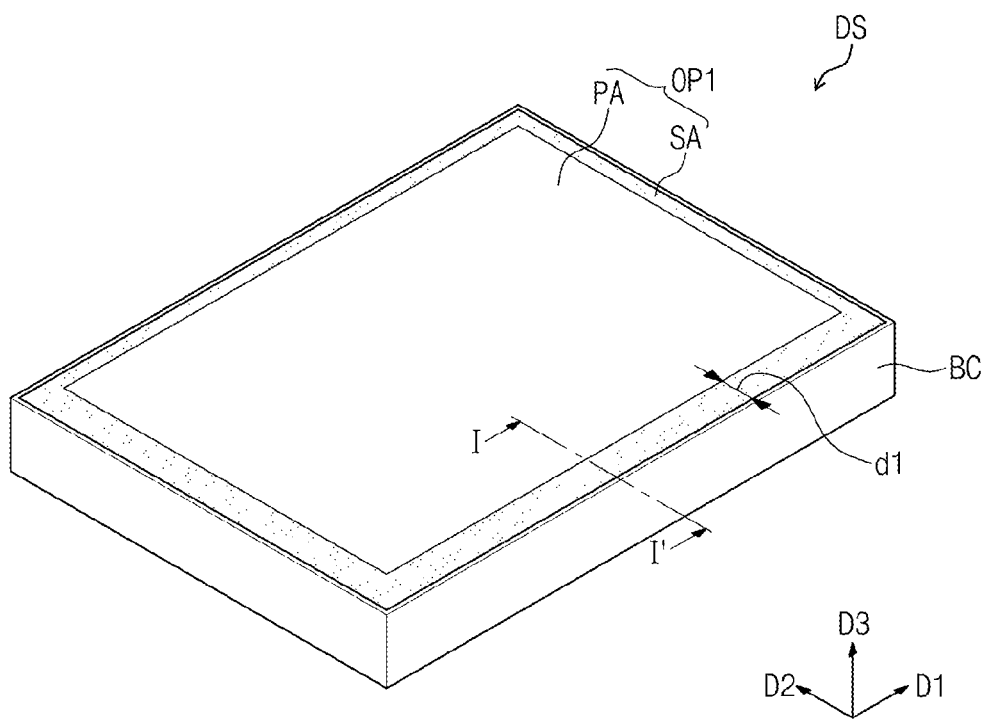
FIG. 3 is a coupling perspective view of the display device of FIG. 1.

FIG. 3 is a coupling perspective view of the display device DS of FIG. 1 and FIG. 4 is a sectional view taken along a line I-I' of FIG. 3. FIG. 4 illustrates the case that the display panel DP is a liquid crystal display panel. Hereinafter, a display device according to an embodiment of the inventive concept will be described with reference to FIGS. 3 and 4. Moreover, like reference numerals refer to like elements throughout FIGS. 1 to 4 and repeated descriptions are omitted.

The cover member BC accommodates the display panel, the first polarization member OP1, a second polarizer OP2, and the backlight unit BLU (see FIG. 1). The cover member BC covers the first polarization member OP1, the display panel DP, and the side surfaces of the light guide plate LGP. The cover member BC exposes the front surface of the first polarization member OP1. Moreover, according to another embodiment of the inventive concept, the cover member BC may further include an upper side part (not shown) bent from the top end of the sidewall part BC-W4 to cover a portion of the first polarization member OP1 in a plan view.

The display panel DP may include a first base substrate BS1, a pixel PX, a plurality of insulating layers IN1 and IN2, a second base substrate BS2, a color filter CF, a common electrode CE, and a liquid crystal layer LCL.

The first base substrate BS1 includes one surface which face outside of the display panel DP and the other surface facing the one surface. The one surface of the first base substrate BS1 faces the outside of the display device DS and a plurality of devices for operating the display panel are mounted on the other surface. The first base substrate BS1 may be a transparent substrate such as a glass substrate or a plastic substrate.

The pixel PX is disposed on the other surface of the first base substrate BS1. The pixel PX includes a thin film transistor TFT and a pixel electrode PE. The thin film transistor TFT includes a gate electrode GE, a source electrode SE, a drain electrode DE, and a semiconductor layer AL.

The gate electrode GE is disposed on the other surface of the first base substrate BS1. The gate electrode GE is connected to the gate line GLi (see FIG. 2). The gate electrode GE may be formed of the same material in the same plane as the gate line GLi.

The gate electrode GE and the gate line GLi may include a low reflective conductive material. For example, the gate electrode GE and the gate line GLi may include titanium, indium zinc oxide, indium tin oxide, copper, an alloy thereof, or an alloy of each. The gate electrode GE and the gate line GLi may have a multilayer structure including at least one of the above-mentioned materials.

The semiconductor layer AL is disposed on the gate electrode GE. The semiconductor layer AL includes a semiconductor material. The semiconductor layer AL overlaps the gate electrode GE.

An insulating layer Ni may be disposed between the semiconductor layer AL and the gate electrode GE. The insulating layer IN1 may include an organic material and/or an inorganic material. The insulating layer IN1 insulates the semiconductor layer AL from the gate electrode GE.

The source electrode SE and the drain electrode DE are disposed on the semiconductor layer AL. The source electrode SE and the drain electrode DE are spaced apart from each. Each of one side of the source electrode SE and one side of the drain electrode DE may overlap the semiconductor layer AL and may overlap the gate electrode GE. Although not shown in the drawing, the other side of the source electrode SE may be connected to the data line DLj (see FIG. 2).

The pixel electrode PE is disposed on the thin film transistor TFT. The pixel electrode PE includes a transparent conductive material. For example, the pixel electrode PE may include zinc oxide, tin oxide, indium oxide, gallium oxide, indium tin oxide, indium zinc oxide, zinc indium tin oxide, gallium indium oxide, and an alloy thereof.

An insulating layer IN2 may be disposed between the pixel electrode PE and the thin film transistor TFT. The insulating layer IN2 may be a passivation layer or planarization layer. The insulating layer IN2 may include an organic material and/or an inorganic material. The insulating layer IN2 covers the thin film transistor TFT to protect it from other elements.

The insulating layer IN2 may include at least one contact hole. The pixel electrode PE may be electrically connected to the thin film transistor TFT through the contact hole.

The second base substrate BS2 is spaced apart from the base substrate BS1 with the liquid crystal layer LCL interposed therebetween. The second base substrate BS2 may be formed of the same material as the first base substrate BS1 but is not limited thereto.

The second base substrate BS2 may expose at least one side of the first base substrate BS1. For example, the second base substrate BS2 may overlap the display area DA and may not overlap some portions of the non-display area NDA.

In this embodiment, the second base substrate BS2 may not overlap the first pad area PR1 and the second pad area PR2 (see FIG. 2). The second base substrate BS2 exposes a driving circuit G-IC and/or D-IC. However, this is just exemplary and according to another embodiment of the inventive concept, the second base substrate BS2 may have the same size as the first base substrate BS1 on a plane.

The common electrode GE is disposed on the second base substrate BS2. The common electrode GE may overlap all of a plurality of pixels disposed on the first base substrate BS1. The common electrode CE is disposed to face the pixel electrode PE. The common electrode CE forms an electric field together with the pixel electrode PE and controls the liquid crystal layer LCL.

The color filter CF is disposed between the second base substrate BS2 and the common electrode CE. The color filter CF is disposed adjacent to a black matrix. The color filter CF may overlap the pixel electrode PE and the black matrix BM may overlap the thin film transistor TFT. The black matrix BM prevents a light emitted from the light guide plate LGP from being incident to an adjacent pixels PX.

The liquid crystal layer LCL is disposed between the first base substrate BS1 and the second base substrate BS2. The liquid crystal layer LCL may be sealed by a seal member SL disposed along the edge of the second base substrate BS2. The liquid crystal layer LCL receives light emitted from the light guide plate LGP and adjusts an amount of light passing through the liquid crystal layer LCL and controls the image displayed on the display device.

The first polarization member OP1 is disposed on the one side of the first base substrate BS1. The polarization area PA overlaps the display area DA and the light blocking area SA overlaps the non-display area NDA. For example, the light blocking area SA may be formed along the edge of the polarization area PA.

The light blocking area SA has a predetermined width d1. The width d1 of the light blocking area SA is a distance from a side surface of the first polarization member OP1 to the polarization area PA across the light blocking area SA.

As the width of the light blocking area SA becomes narrower, the relative area of the display area DA is increased but the integration degree of the second wiring parts GW2 and DW2 (see FIG. 2) disposed in the non-display area NDA may be increased too. In this embodiment, the width d1 of the light blocking area SA may be less than about 1.99 mm.

A plurality of scattering patterns SP may be formed in the first polarization member OP1 in the light blocking area SA. The plurality of scattering patterns SP may be integrally formed with the first polarization member OP1. Detailed descriptions for the plurality of scattering patterns SP are described later.

The second polarizer OP2 is disposed on a lower side of second base substrate BS2. The second polarizer OP2 may include a polarization axis in a different direction from the polarization axis of the first polarization member OP1. Moreover, according to another embodiment of the inventive concept, the second polarizer OP2 may be omitted.

Figure 5A:
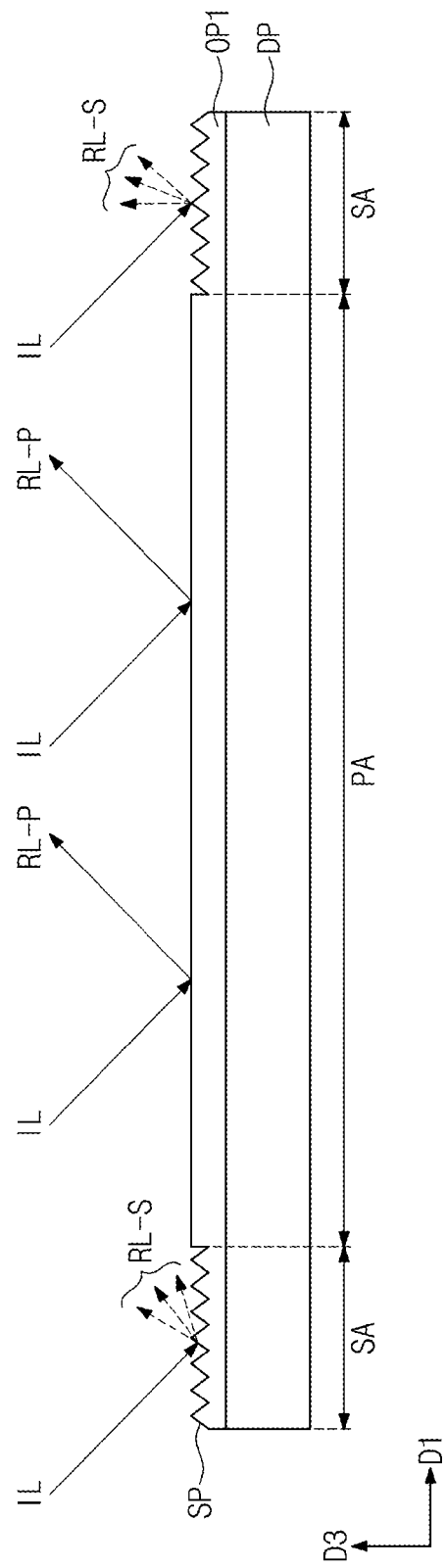
FIG. 5A is a sectional view of a partial configuration of a display device according to an embodiment of the inventive concept.
Figure 5B:
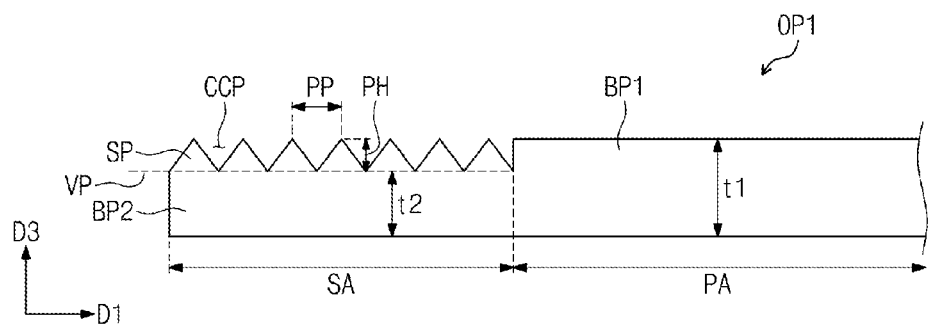
FIG. 5B is a partial enlarged view illustrating a partial configuration shown in FIG. 5A.
Figure 5C:
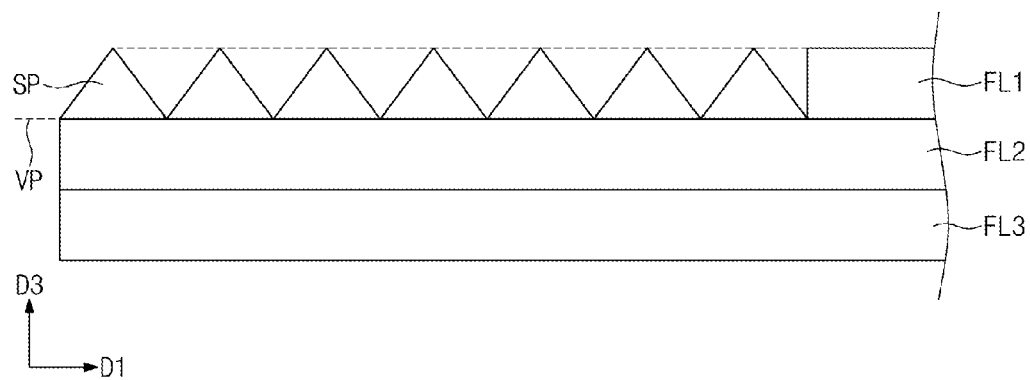
FIG. 5C is a partial enlarged view illustrating a configuration shown in FIG. 5B.

FIG. 5A is a sectional view of a partial configuration of a display device according to an embodiment of the inventive concept. FIG. 5B is a partial enlarged view illustrating a partial configuration shown in FIG. 5A. FIG. 5C is a partial enlarged view illustrating a configuration shown in FIG. 5B. FIG. 5A illustrates the display panel DP and the first polarization member OP1 and FIGS. 5B and 5C illustrate an enlarged partial area of the first polarization member OP1. Hereinafter, the first polarization member OP1 will be described in detail with reference to FIGS. 5A and 5C.

As shown in FIG. 5A, the first polarization member OP1 is disposed on the front of the display panel DP. External light IL is incident on the front of the display panel DP. The external light IL is incident on the first polarization member OP1 before reaching the display panel DP.

The first polarization member OP1 partially reflects the external light IL depending on the external light reflectivity. Each of the polarization area PA and the light blocking area SA has different external light reflectivity. The external light reflectivity may be defined by a ratio of the reflected light by the first polarization member OP1 to the external light incident on the first polarization member OP1.

The polarization area PA has a first external light reflectivity. A portion of external light incident on the polarization area PA is reflected according to the first external light reflectivity and thus generates first reflective light RL-P.

The light blocking area SA has a second external light reflectivity. A portion of external light incident on the light blocking area SA is reflected according to the second external light reflectivity and thus generates second reflective light RL-S. The second reflective light RL-S has a less amount of light than the first reflective light RL-P. That is, the second external light reflectivity is lower than the first external light reflectivity.

External light IL incident on the light blocking area SA may be scattered into a plurality of scattered lights. The second reflective light RL-S may be one of the plurality of scattered lights. External light IL incident on the light blocking area SA may be scattered at various angles by the plurality of scattering patterns formed on the first polarization member OP1.

Reflective light viewed in one direction may be part of the scattered lights scattered at various angles. The plurality of scattering patterns SP formed on the first polarization member OP1 reduce an external light reflectivity in the light blocking area SA. Accordingly, the external reflectivity in the light blocking area SA may be lower than that in the polarization area PA.

As shown in FIG. 5B, the first polarization member OP1 may include the plurality of scattering patterns SP, a first base part BP1, and a second base part BP2. The plurality of scattering patterns SP may be connected to each other in a thickness direction D3 of the first polarization member OP1 in the light blocking area SA.

As shown in FIG. 5B, the plurality of scattering patterns SP may be engraved patterns. Accordingly, the plurality of scattering patterns SP may protrude from the top surface of the second base part BP2 which corresponds to virtual plane VP connecting root of the scattering patterns. The first base part BP1, the second base part BP2, and the plurality of scattering patterns SP may have an integrated configuration.

As shown in FIG. 5B, the first base part BP1 overlaps the polarization area PA. The first base part BP1 has a first thickness t1 in the polarization area PA The first thickness t1 is defined by a thickness of the first polarization member OP1.

The second base part BP2 overlaps the light blocking area SA. The second base part BP2 has a second thickness t2. The second thickness t2 is less than the first thickness t1.

The plurality of scattering patterns SP overlaps the light blocking area SA. The plurality of scattering patterns SP is disposed on the front surface of the second base part BP2. The plurality of scattering patterns SP and the second base part BP2 may have an integrated configuration.

The plurality of scattering patterns SP protrude from the front of the second base part BP2. The plurality of scattering patterns SP may be formed by removing a portion corresponding to the light blocking area SA of the first polarization member OP1. Accordingly, the plurality of scattering patterns SP may include the same material as the first polarization member OP1.

The removed portion may be a plurality of engraved patterns CCP and the plurality of scattering patterns SP. In the light blocking area SA, the plurality of scattering patterns SP may have a predetermined pattern form. A display device according to an embodiment of the inventive concept has the plurality of scattering patterns SP on the light blocking area SA and thus may reduce an external light reflectivity of the light blocking area SA.

Each of the plurality of scattering patterns SP has a predetermined height PH. The height PH may be a distance between a virtual plane VP corresponding to a boundary line between the first base part BP1 and the plurality of scattering patterns SP and crest of the plurality of scattering patterns SP.

The sum of the height PH and the second thickness t2 may be equal to or less than the first thickness t1. Additionally, an average thickness in the polarization area PA of the first polarization member OP1 is greater than that in the light blocking area SA.

In this embodiment, each of the plurality of scattering patterns SP has the same height PH. However, the inventive concept is not limited thereto and thus the plurality of scattering patterns SP may have different heights PH.

The centers of adjacent scattering patterns among the plurality of scattering patterns SP are spaced a predetermined interval PP apart from each other. The interval PP may be defined by a distance between each crest of the plurality of scattering patterns SP.

In this embodiment, the plurality of scattering patterns SP may be disposed to allow the center points of the plurality of scattering patterns SP to be arranged at the same interval PP. However, the inventive concept is not limited thereto and according to another embodiment of the inventive concept, the interval PP between may vary.

The height PH of each of the plurality of scattering patterns SP and the interval PP between the center points of the plurality of scattering patterns SP may affect the reflectivity of the light blocking area SA. According to the height PH and the interval PP, the reflectivity of external light IL incident on the light blocking area SA may vary. This will be described in more detail later.

As shown in FIG. 5C, the first polarization member OP1 may include a plurality of layers FL1, FL2, and FL3. The plurality of layers FL1, FL2, and FL3 includes a first layer FL1, a second layer FL2, and a third layer FL3.

Figure 6:
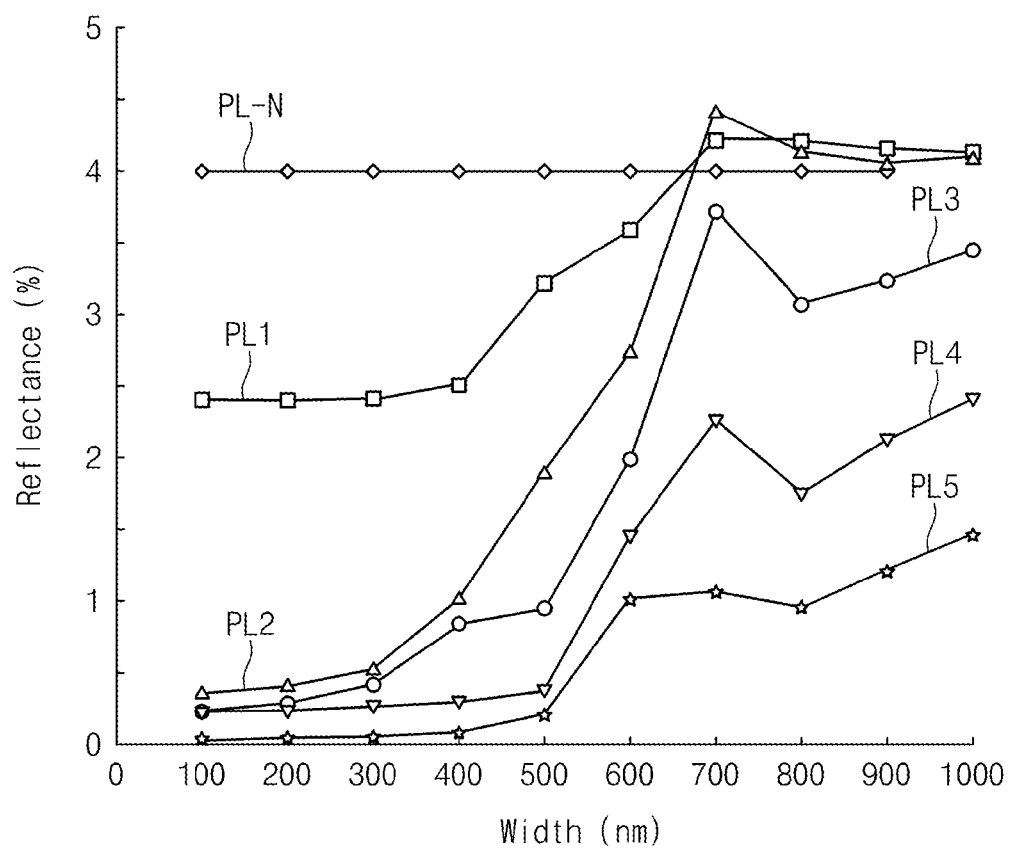
FIG. 6 is a graph illustrating reflectivity of a display device to externally incident light according to an embodiment of the inventive concept.

The plurality of the scattering patterns SP defined in one layer of the plurality of layers FL1, FL2, and FL3. The "integrally formed" may include a case that the plurality of the scattering patterns is formed at least one of the plurality of layers FL1, FL2, and FL3. FIG. 6 illustrates an example having the plurality of the scattering patterns SP in the first layer FL1.

The first layer FL1 may be the outermost layer of the first polarization member OP1. The front of the first layer FL1 may be the front surface of the first polarization member OP1. The external light IL may be incident on the first layer FL first among the plurality of layers FL1, FL2, and FL3. The first layer FL1 may be a protective layer. For example, the first layer FL1 may include Tri-acetyl Cellulose (TAC).

The second layer FL2 may be disposed on the bottom surface of the first layer FL1. The second layer FL2 may be a polarizer. For example, the second layer FL2 may include Poly Vinyl Alcohol (PVA) that is stretched and aligned by absorbing iodine. The third layer FL3 may face the first layer FL1 with the second layer FL2 therebetween. The third layer FL3 may be a protective layer protecting the second layer FL2. For example, the third layer FL3 may include Tri-acetyl Cellulose (TAC).

The plurality of scattering patterns SP may be formed by removing part of the first polarization member OP1 among the plurality of layers FL1, FL2, and FL3. For example, the plurality of scattering patterns SP may be formed by removing part of the first layer FL1 in the light blocking area SA. The first layer FL1 in the light blocking area SA may be completely removed. However, the first layer FL1 in the light blocking area SA may be partially removed to have a remained portion of the first layer FL1 on the second layer FL2. At this point, the removed portion may be the plurality of engraved patterns CCP.

The first base part BP1 may include the first to third layers FL1, FL2, and FL3. The second base part BP2 may include the second layer FL2 and the third layer FL3 with or without the remained first layer FL1. A difference between the first thickness t1 and the second thickness t2 may correspond to the thickness of the first layer FL1 when the first layer FL1 in the engraved pattern is completely removed. The first thickness t1 may correspond to the total sum of the thicknesses of the plurality of layers FL1, FL2, and FL3 forming the first polarization member OP1. The plurality of scattering patterns SP may not protrude more than the top surface of the first layer FL1.

Although not shown in the drawing, at least one adhesive layer may be further disposed between the plurality of layers FL1, FL2, and FL3. The adhesive layer strengthens the coupling force between the plurality of layers FL1, FL2, and FL3. Additionally, the adhesive layer may be disposed between the first polarization member OP1 and the first base substrate BS1 to strengthen the coupling force between the first polarization member OP1 and the display panel DP.

FIG. 6 is a graph illustrating an external light reflectivity of a display device according to an embodiment of the inventive concept. FIG. 6 illustrates an external light reflectivity according to an interval between a plurality of scattering patterns. Hereinafter, a configuration of a first polarization member refers to FIGS. 5A and 5B.

FIG. 6 illustrates external light reflectance of a plurality of embodiments. The plurality of embodiments include scattering patterns having different heights. FIG. 6 illustrates an external light reflectance of each of a first embodiment PL1 including a plurality of scattering patterns having a height of about 100 nm, a second embodiment PL2 including a plurality of scattering patterns having a height of about 200 nm, a third embodiment PL3 including a plurality of scattering patterns having a height of about 300 nm, a fourth embodiment PL4 including a plurality of scattering patterns having a height of about 400 nm, and a fifth embodiment PL5 including a plurality of scattering patterns having a height of about 500 nm. In the embodiments, the height and interval of each of the first to fifth embodiments PL1 to PL5 is based on an average value.

FIG. 6 also illustrates an external light reflectance of a comparative example PL-N having no scattering patterns. The external light reflectance of a comparative example PL-N may correspond to the external light reflectance in the polarization are PA of the first polarization member OP1.

As shown in FIG. 6, since additional scattering patterns are not formed, the external light reflectance of the comparative example PL-N according to the interval PP is constant. In this embodiment, the external light reflectance of the comparative example PL-N has about 4%.

As shown in FIG. 6, the external light reflectance of the first polarization member OP1 is reduced as the height PH of the plurality of scattering patterns is increased. However, the external light reflectivity of the first polarization member OP1 may vary depending on the interval (width in FIG. 6) PP between adjacent scattering patterns SP even when the plurality of scattering patterns SP have the same height PH.

As shown in FIG. 6, the external light reflectance of the first polarization member OP1 is increased as the interval PP of the plurality of scattering patterns is increased. The external light reflectance of the first polarization member OP1 is maintained low when the interval PP is in a range of about 100 nm to about 400 nm, is drastically increased when the interval PP is in a range of about 400 nm to about 700 nm, and is gradually increased when the interval PP is in a range of more than about 800 nm.

As shown in FIG. 6, the first to fifth embodiments PL1 to PL5 may have an external light reflectance relatively lower than that of the comparative example PL-N when the interval PP is in a range of less than about 600 nm.

Accordingly, a plurality of scattering patterns having a height HP in a range of more than about 100 nm and an interval between scattering patterns in a range of about 100 nm to about 600 nm may reduce an external light reflectance in an area where the plurality of scattering patterns SP are formed.

Figure 7A:
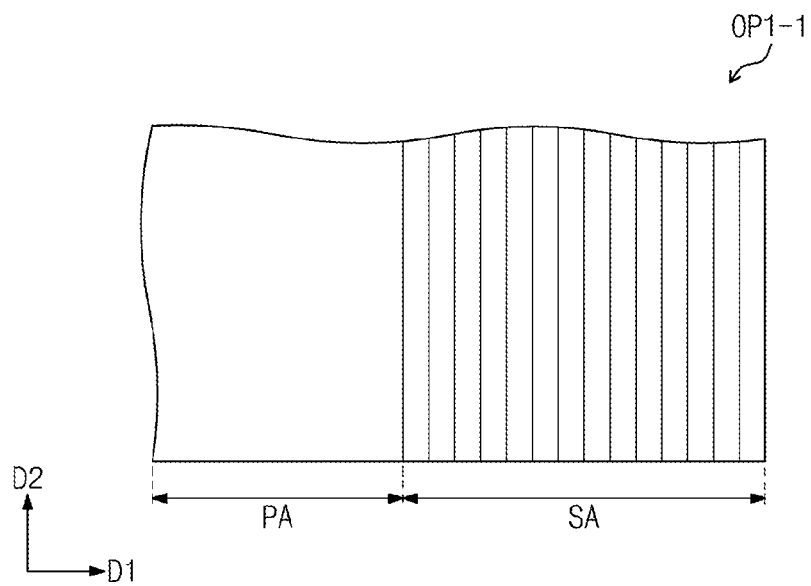
FIG. 7A is a partial plan view of a first polarization member according to an embodiment of the inventive concept.
Figure 7B:
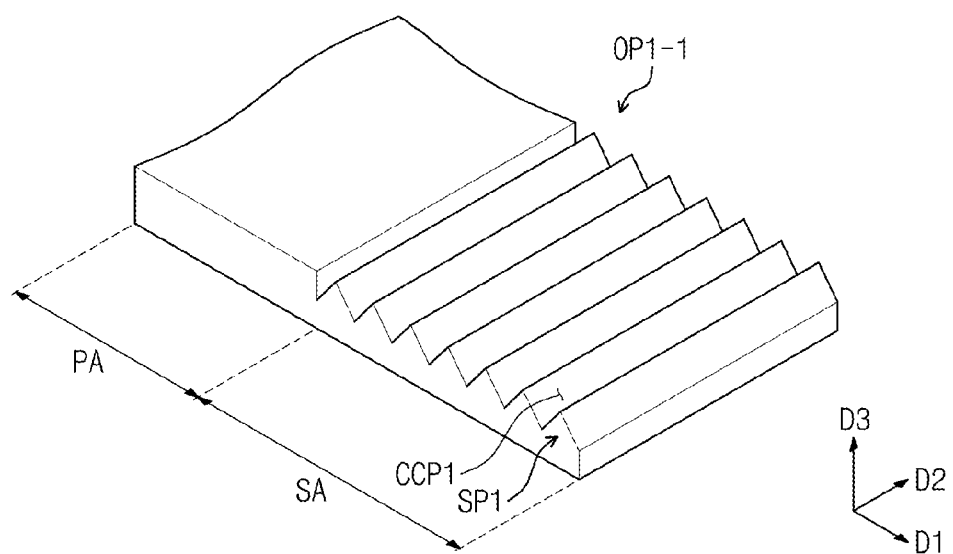
FIG. 7B is a partial perspective view of a first polarization member according to an embodiment of the inventive concept.

FIG. 7A is a partial plan view of a first polarization member according to an embodiment of the inventive concept. FIG. 7B is a partial perspective view of a first polarization member according to an embodiment of the inventive concept. Like reference numerals refer to like elements throughout FIGS. 5A, 5B, 7A, and 7B and detailed descriptions are omitted.

FIGS. 7A and 7B illustrate an embodiment including a plurality of scattering patterns SP1 having a uniform height PH and a uniform interval PP. However, the inventive concept is not limited thereto and according to another embodiment of the inventive concept, the plurality of scattering patterns SP1 may have different heights PH and/or different intervals PP.

As shown in FIGS. 7A and 7B, the plurality of scattering patterns SP1 may be a prism extending in one direction.

The plurality of scattering patterns SP1 extend in a second direction D2 and are arranged in a first direction intersecting the second direction D2. The heights of the plurality of scattering patterns SP1 may correspond to a height of the prism. Additionally, the intervals of the plurality of scattering patterns SP1 may correspond to a distance between the crests or roots of the prism.

However, the inventive concept is not limited thereto and thus the plurality of scattering patterns SP1 may have various cross section. For example, the plurality of scattering patterns SP1 may have a rectangular or semicircular configuration.

Moreover, a plurality of engraved patterns CCP1 may be formed in the light blocking area SA. The plurality of engraved patterns CCP1 may correspond to portions removed from the first polarization member OP1-1. According to the forms of the plurality of engraved patterns CCP1, the forms of the plurality of scattering patterns SP1 formed in the light blocking area SA may vary. In this embodiment, the plurality of engraved patterns CCP1 may have a prism shape.

Figure 8A:
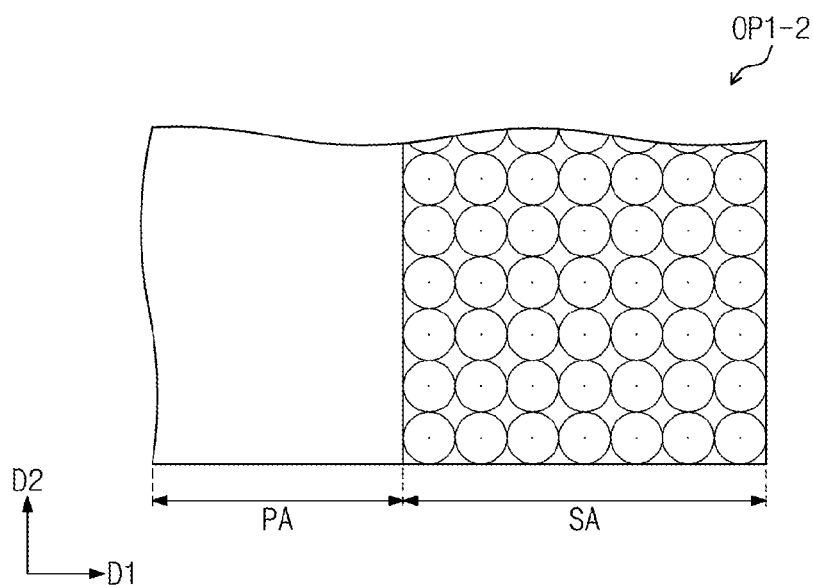
FIG. 8A is a partial plan view of a first polarization member according to an embodiment of the inventive concept.
Figure 8B:
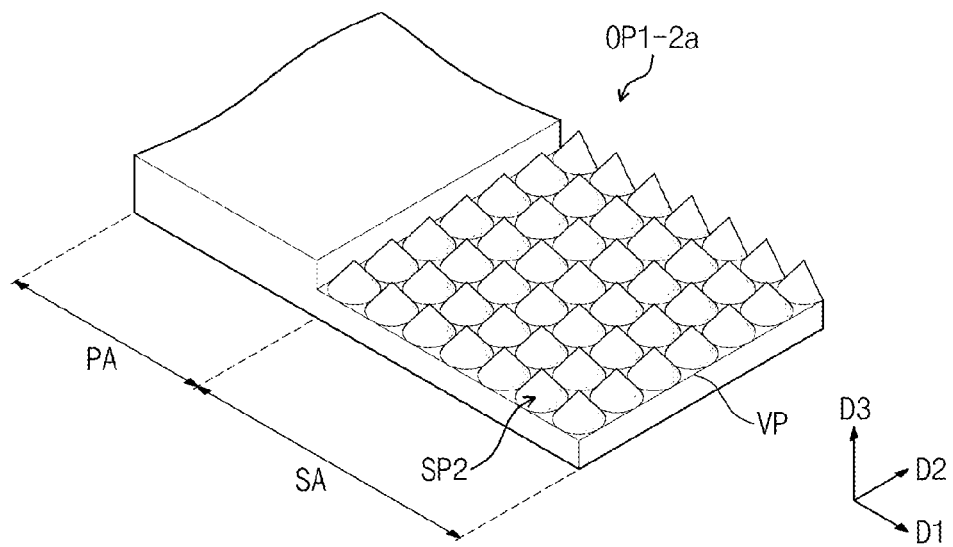
FIG. 8B is a partial perspective view of a first polarization member according to an embodiment of the inventive concept.
Figure 8C:
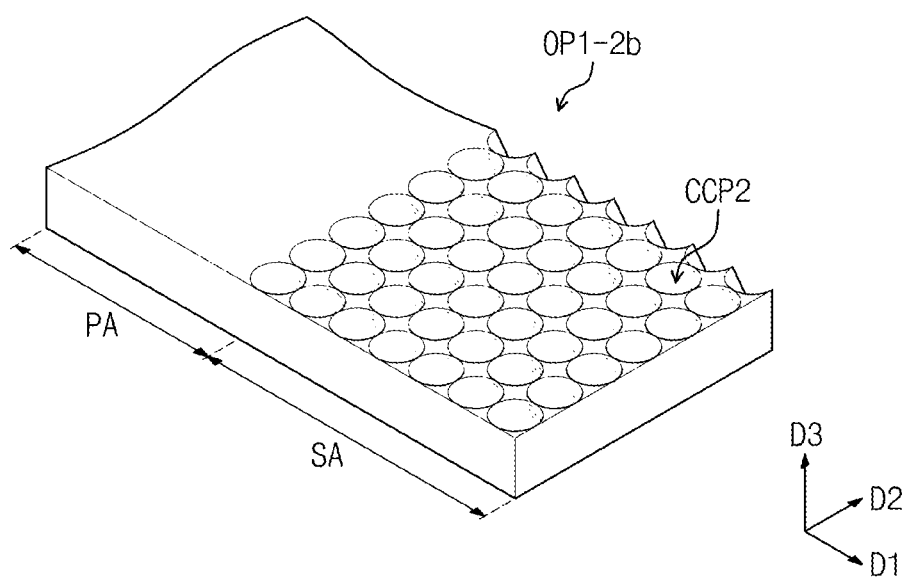
FIG. 8C is a partial perspective view of a first polarization member according to an embodiment of the inventive concept.

FIG. 8A is a partial plan view of a first polarization member according to an embodiment of the inventive concept. FIG. 8B is a partial perspective view of a first polarization member according to an embodiment of the inventive concept. FIG. 8C is a partial perspective view of a first polarization member according to an embodiment of the inventive concept. FIG. 8C is a partial perspective view of a first polarization member according to an embodiment of the inventive concept. Like reference numerals refer to like elements throughout FIGS. 5A, 5B, 8A, 8B, and 8C and detailed descriptions are omitted.

As shown in FIG. 8A, a plurality of patterns may have cone shape. The plurality of patterns having a circular form in a plan view may be formed in the light blocking area SA of the first polarization member OP1-2. In this embodiment, the circular patterns may have the same interval PP between adjacent patterns. The interval PP may correspond to a distance between the center points of the circular patterns. According to another embodiment, the circular patterns may be disposed at different intervals PP.

Although not shown in the drawing, the plurality of scattering patterns SP2 may be arranged at a wider interval PP. As the interval is increased, the area of the top surface of the second base part BP2 exposed to the outside is increased. A line connecting the top surface of the second base part BP2 may correspond to the virtual surface VP.

As the interval PP of the plurality of scattering patterns SP2 is increased, an external light reflectivity in the light blocking area SA may be more affected by the top surface of the second base part BP2 and may be less affected by the plurality of scattering patterns SP2.

As shown in FIG. 8B, the first polarization member OP1-2a may include a plurality of scattering patterns SP2 having a cone shape. The plurality of scattering patterns SP2 may be arranged to have a matrix configuration along the first direction D1 and the second direction D2.

The plurality of scattering patterns SP2 may have a uniform height PH. The height PH may correspond to the height of the cone. A plurality of cone shaped auxiliary scattering patterns (not shown) may be formed between the plurality of scattering patterns SP2 to further decrease reflectance of the light blocking area SA.

As shown in FIG. 8C, the first polarization member OP1-2b may include a plurality of engraved patterns CCP2 having a cone shape. The plurality of engraved patterns CCP2 may be arranged in a matrix configuration along the first direction D1 and the second direction D2. Patterns formed by engraving areas corresponding to the plurality of engraved patterns CCP2 are formed in the light blocking area SA. A plurality of cone shaped auxiliary engraved patterns (not shown) may be formed between the plurality of engraved patterns CCP2 to further decrease reflectance of the light blocking area SA The plurality of engraved patterns CCP2 may have a uniform depth. The depth of the plurality of engraved patterns CCP2 may correspond to the height of the plurality of scattering patterns SP2. The depth may correspond to the height of the cone. Accordingly, as shown in FIGS. 8A to 8C, even with the same configuration in a plan view, the scattering patterns may be the first polarization member OP1-2a where the plurality of scattering patterns SP2 are formed and the first polarization member OP1-2b where the plurality of engraved patterns CCP2 are formed.

Although not shown in the drawing, the plurality of scattering patterns and the plurality of engraved patterns may be formed through various processes. For example, the light blocking area SA may be formed through a plasma process.

A polymer layer serving as a mask is formed on a polarization member. The polymer layer overlaps the polarization area PA and the light blocking area SA of a polarization member. And some particles reacting with the polymer layer is sprinkled on the light blocking area SA. The particles are grains having a nano-sized diameter.

Then, through reactive ion etching (RIE), an area where no mask grains are disposed in the polymer layer is etched. An area not overlapping the mask grains among areas of the polarization member is exposed to the outside through the RIE.

Then, the exposed areas are etched through UV-Nanoimprint Lithography. Then, when the remaining polymer layer is removed, scattering patterns formed by removing areas corresponding to the diameters of the mask grains may be formed in the light blocking area SA. Moreover, the light blocking area SA is not limited to any one process and may be formed through various processes. For example, the light blocking area SA may be formed through a wet-etching process, an embossing process by a roller, an embossing process by ultra violet (UV), or a nano-imprint process, and is not limited one of them.

According to the inventive concept, different reflectivities may be provided according to an area by forming scattering patterns in a polarization member. Since an area where scattering patterns are formed has a relatively low reflectivity, by arranging the area to correspond to an area where a wiring part is integrated among areas of a display panel, an external light reflectance of a display corresponding to the wiring part may be decreased.

Additionally, since the scattering patterns are integrally formed with the polarization member, low reflective effect may be derived without adding an additional elements. Accordingly, processes are simplified and costs are saved so that productivity is improved.

Additionally, since the scattering patterns are formed with a fine size having a nano scale, the width of a bezel formed at the edge of a display device may be reduced. The scattering patterns may be effectively applied to a high resolution display device having highly integrated wire patterns. Accordingly, a display device according to the inventive concept may be useful to realize narrow bezel.

According to the inventive concept, the display device includes a display panel having a display area of the display panel and a light blocking area corresponding to a non-display area of the display panel. A plurality of scattering patterns are formed in the light blocking area. The plurality of scattering patterns reduce a reflectance of the non-display area. Accordingly, an external light reflectance may be reduced in the non-display area that has a highly integrated signal wiring.

Additionally, according to the inventive concept, since scattering patterns are integrally formed in a polarization member, a low reflective display device with improved visibility may be provided without adding another additional element.

The above-disclosed subject matter is to be considered illustrative and not restrictive, and the appended claims are intended to cover all such modifications, enhancements, and other embodiments, which fall within the true spirit and scope of the inventive concept. Thus the scope of the inventive concept shall not be restricted or limited by the foregoing detailed description.

What is claimed is:
1. A display device comprising:
a display panel including a display area where an image is displayed and a non-display area adjacent to the display area; and
a first polarization member disposed on a front surface of the display panel and including a polarization area corresponding to the display area and a light blocking area corresponding to the non-display area,
wherein the first polarization member comprises a plurality of scattering patterns in the light blocking area, the scattering patterns being formed in one piece with the first polarization member, and
wherein the plurality of the scattering patterns makes the light blocking area to have a lower reflectance to externally incident light than the polarization area.

2. The display device of claim 1, wherein the reflectance of the light blocking area to externally incident light is less than about 4%.

3. The display device of claim 1, wherein a height of each of the plurality of scattering patterns is more than about 0.1 μm and less than about 100 μm.

4. The display device of claim 3, wherein a distance between centers of scattering patterns adjacent to each other is more than about 100 nm and less than about 600 nm.

5. The display device of claim 1, wherein an average thickness of the first polarization member at the polarization area is greater than an average thickness at the light blocking area.

6. The display device of claim 5, wherein the light blocking area surrounds the polarization area.

7. The display device of claim 1, wherein the first polarization member comprises:
a first base part overlapping the polarization area; and
a second base part overlapping the light blocking area and having a smaller average thickness than the first base part,
wherein the plurality of scattering patterns are disposed on a front surface of the second base part.

8. The display device of claim 7, wherein the plurality of scattering patterns are integrally formed with the second base part.

9. The display device of claim 8, wherein the plurality of scattering patterns are not protruded from a plane which includes a front surface of the first base part.

10. The display device of claim 9, wherein each of the plurality of scattering patterns has a conical form.

11. The display device of claim 1, wherein the first polarization member comprises:
a first layer having a front surface that defines a front surface of the first polarization member and overlapping the polarization area; and
a second layer overlapping the polarization area and the light blocking area and disposed at a bottom surface of the first layer,
wherein a height of each of the plurality of scattering patterns is equal or less than a thickness of the first layer.

12. The display device of claim 11, wherein the plurality of scattering patterns comprise the same material as the first layer.

13. The display device of claim 1, wherein the display panel comprises:
a first base substrate;
a plurality of pixels disposed on the first base substrate to correspond to the display area;
a plurality of signal lines connected respectively to corresponding pixels among the plurality of pixels; and
a driving circuit providing a driving signal to the signal lines, and
wherein each of the plurality of signal lines includes a part overlapping the display area and connected to each of the pixels, and another part overlapping the non-display area and connected to the driving circuit.

14. The display device of claim 13, wherein a width of the light blocking area is less than about 1.99 mm.

15. The display device of claim 1, wherein the first polarization member is disposed on one side of a first base part defining the front surface of the display panel.

16. A display device comprising:
a display panel including a display area where an image is displayed and a non-display area adjacent to the display area; and
a first polarization member disposed on a front surface of the display panel and including a polarization area corresponding to the display area and a light blocking area corresponding to the non-display area,
wherein the first polarization member comprises a plurality of engraved patterns corresponding to the light blocking area,
wherein the plurality of engraved patterns makes the light blocking area to have a lower reflectance to externally incident light than the polarization area, and
wherein a distance between centers of engraved patterns adjacent to each other is more than about 100 nm and less than about 600 nm.

17. The display device of claim 16, wherein the reflectance of the light blocking area to externally incident light is less than about 4%.

18. The display device of claim 17, wherein the light blocking area has a width less than about 1.99 mm.

19. The display device of claim 18, wherein a depth of each of the plurality of engraved patterns is more than about 0.1 μm and less than about 100 μm.

20. The display device of claim 19,
wherein the first polarization member comprises:
a polarization layer where at least one polarization axis is defined;
a first protective layer disposed on a front surface of the polarization layer; and
a second protective layer facing the first protective layer with the polarization layer therebetween,
wherein the plurality of engraved patterns are defined in an area overlapping a light blocking area of the first protective layer.

* * * * *